United States Patent [19]

Lange

[11] 4,255,035
[45] Mar. 10, 1981

[54] RING ELEMENT FOR CAMERA MECHANISM

[75] Inventor: Karl-Heinz Lange, Bunde, Fed. Rep. of Germany

[73] Assignee: Balda-Werke Photgraphische Gerate und Kunstosoff GmbH & Co., KG, Bunde, Fed. Rep. of Germany

[21] Appl. No.: 74,928

[22] Filed: Sep. 13, 1979

[30] Foreign Application Priority Data

Sep. 13, 1978 [DE] Fed. Rep. of Germany ....... 2839788

[51] Int. Cl.$^3$ .............................................. G03B 9/08
[52] U.S. Cl. .................................................... 354/230
[58] Field of Search ............... 354/228, 230, 232, 233, 354/226, 231

[56] References Cited

U.S. PATENT DOCUMENTS

| 2,900,885 | 8/1959 | Gebele | 354/226 |
| 3,069,989 | 12/1962 | Kiper | 354/233 |
| 3,108,528 | 10/1963 | Rentschler | 354/231 |
| 3,733,991 | 5/1973 | Kobayashi et al. | 354/230 |

FOREIGN PATENT DOCUMENTS 1732773 of 0000 Fed. Rep. of Germany .
1890083 of 0000 Fed. Rep. of Germany .
1903857 of 0000 Fed. Rep. of Germany .
1908068 of 0000 Fed. Rep. of Germany .
2218195 of 0000 Fed. Rep. of Germany .

*Primary Examiner*—Donald A. Griffin
*Attorney, Agent, or Firm*—Blum, Kaplan, Friedman, Silberman and Beran

[57] ABSTRACT

A ring-shaped element for a camera mechanism formed from a metal sheet material is provided. Selected areas of the ring element are provided with operating regions of a synthetic material for providing operative engagement surfaces. The inwardly facing surfaces of the synthetic material provide a sliding surface for rotation about the fixed camera part. Rotation of the ring elements actuates a camera mechanism such as the shutter. A camera shutter includes a series of the ring elements mounted for rotation about a fixed camera part having a central axis which traverses the center of the ring elements. Several ring elements may be arranged successively with the synthetic material regions on adjacent rings at different radial positions so that the rings may be disposed in close proximity for providing a compact construction.

14 Claims, 4 Drawing Figures

RING ELEMENT FOR CAMERA MECHANISM

BACKGROUND OF THE INVENTION

This invention relates generally to a ring-shaped element for a camera mechanism, and in particular to an improved locking-ring element formed from a metal sheet material wherein operating and engagement regions formed of synthetic material are selectively disposed about the ring and provide lubricating surfaces so that the ring may rotate about a fixed camera member.

Conventional metal rings for camera mechanism, such as shutters are suitable for providing the required dimensional accuracy. However, several disadvantages and shortcomings are inherent in the use of these metal rings in view of additional costly manufacturing steps. Initially, the metal rings are usually formed by punching from a metal sheet and the regions of the metal rings used for locking shutter parts have to be carefully worked and finished to provide the required surface quality. Without this additional working of the punched parts, the required dimensional accuracy cannot be achieved. An additional shortcoming of these conventional metal shutter rings is that it is not possible to punch the complicated operational and engagement regions from the metal sheet. These engagement areas are utilized for actuation of the camera mechanisms by rotation of the locking rings. It is generally only possible to form angled lugs or similar regions in the metal ring in one piece.

When one wishes to provide a complicated engagement region on an all-metal ring for activation of a camera mechanism, such as the shutter, additional manufacturing steps are required. It is not possible to form these complicated engagement regions in one piece at the time of formation of the ring. These complicated engagement regions must be added on to the ring after punching, such as by riveting or the like. An additional serious problem has always been a need for dimensional accuracy and consistency. These requirements generally are inconsistent with the need to use a formable material for the formation of operating surfaces, angle flaps, lugs or similar regions.

In order to overcome the above-mentioned disadvantages of metal rings, rings formed from synthetic materials have been proposed. Surely, such rings formed from synthetic material have the advantage that the desired engagement regions can be easily formed in the desired shape. However, when the rings are formed wholly of a synthetic material or if the synthetic material is applied as a shield about a metal ring, they must be formed thick in order to provide the required dimensional accuracy and consistency. Even when the synthetic material is a shield, shrinkage or contraction of the synthetic material leads to considerable inaccuracies. This makes these rings formed from synthetic materials unsuitable for use in place of the conventional metal rings. For these reasons, fast-moving locking rings formed from a synthetic material have not been acceptable. These inherent problems in the rings formed from synthetic materials arise even in slow-moving adjustable rings.

Accordingly, it would be desirable to provide a ring-shaped element for a camera mechanism which provides the high dimensional accuracy and consistency required. In addition, it would be desirable to provide such a locking-ring having as low a mass as possible and which does not need to be worked after forming. At the same time, it is desirable to provide rings having relatively complicated engagement regions which can be assembled in series in a space-saving construction.

SUMMARY OF THE INVENTION

Generally speaking, in accordance with the invention, a ring-shaped element for a camera mechanism, especially a ring element formed from a metal sheet material for use in a camera shutter is provided. A locking ring is formed with engagement regions for selectively operating the camera mechanisms, such as the camera shutter. The locking-ring element is formed with regions of synthetic material for forming the engagement members and for providing operating surfaces. Cooperating lubricating surfaces between the ring-shaped element and the fixed camera member for rotation of the ring element thereabout are also provided.

A camera mechanism including a ring-shaped element constructed and arranged in accordance with the invention may include at least one ring-shaped elements disposed for rotation about the central axis of a fixed part of the camera. A shutter may include a plurality of rings positioned adjacent to each other. In this construction, the regions of synthetic material are at different angled positions in order to permit the rings to be brought relatively close to each other. This overlapping in the axial direction permits a space-saving construction. In accordance with the invention, the regions of synthetic material may be applied by extrusion coating.

Accordingly, it is an object of the invention to provide an improved ring-shaped element for a camera mechanism.

Another object of the invention is to provide an improved ring-shaped element formed from a metal sheet material.

A further object of the invention is to provide an improved locking-ring element for a camera shutter.

Still another object of the invention is to provide an improved ring-shaped element for a camera mechanism which is mounted about a fixed camera part for rotation thereabout.

Still a further object of the invention is to provide an improved rotatable ring-shaped element formed from a metal sheet material having selective regions of a synthetic material extruded thereon.

Another object of the invention is to provide an improved ring-shaped element formed with camming regions of a synthetic material extrusion coated thereon.

Still another object of the invention is to provide an improved camera shutter including at least one locking ring-shaped element formed from a metal sheet material including camming regions of a synthetic material selectively disposed thereon.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
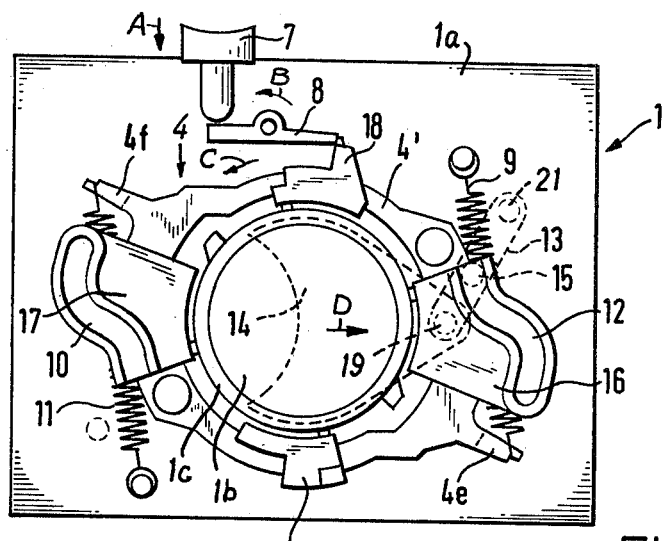
FIG. 1 is a plan view of a shutter including a locking ring-shaped element constructed and arranged in accordance with the invention.
Figure 3:
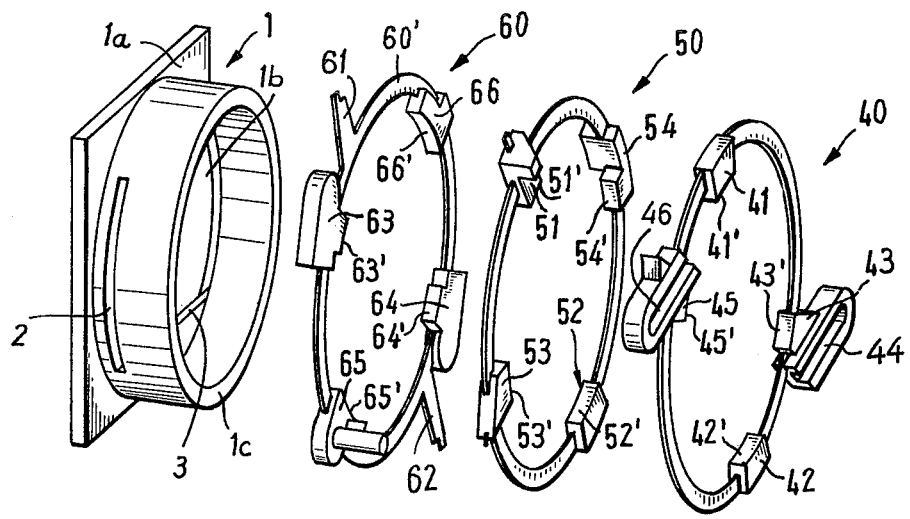
FIG. 3 is an exploded perspective view of a shutter including three ring-shaped elements constructed and arranged in accordance with the invention.

Referring to FIGS. 1 and 3, a partial plan view of a shutter including a locking ring-shaped element constructed and arranged in accordance with the invention is shown generally as 1. Shutter 1 includes a substantially planar shutter frame 1a having a substantially circular opening 1b therethrough and a substantially cylindrical shutter housing 1c disposed substantially perpendicular to shutter frame 1a. Housing 1c is provided with a slit 2 for passing a shutter blade therethrough for displacement along an edge 3. In FIG. 1, only a first locking shutter blade 14 is shown for ease of illustration. Locking shutter blade 14 is activated by a toggle switch which includes a toggle lever 13 pivotally mounted to blade 14 at one end by a pin 19 and pivotally mounted to planar shutter frame 1a by a pin 21. A guide pin 15 is provided on toggle lever 13 for operatively displacing locking shutter blade 14 in camming fashion as will be described in more detail below.

Figure 2:
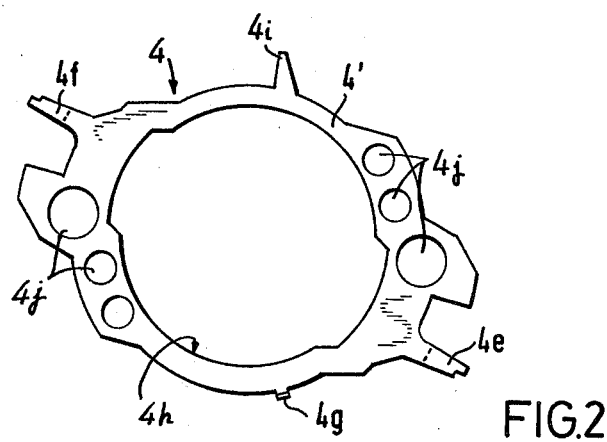
FIG. 2 is a plan view of the locking ring-shaped element utilized in the shutter illustrated in FIG. 1.

A locking ring-shaped element shown generally as 4 constructed and arranged in accordance with the invention is disposed about cylindrical shutter housing 1c. As shown in FIG. 2, locking ring-shaped element 4 is formed from a substantially circular metal sheet material 4' having a substantially circular opening 4h which is dimensioned to fit over housing 1c. Ring-shaped element 4 includes a pair of substantially opposed outwardly extending engagement arms 4e and 4f, a right-angle bent lug 4g adjacent to arm 4e and a shutter release engagement arm 4i. Metal sheet material 4' is formed with a plurality of openings 4j for receiving regions of synthetic material for providing engagement and working surfaces. For example, a first engagement region 16 of a synthetic material is formed with a curved track 12 for operating shutter blade 14 and a second engagement region 17 is formed with an operating curved track 10 and formed from a synthetic material are shown. Engagement regions 16 and 17 are anchored to metal ring 4' at the opposed openings 4j. An additional region of synthetic material 18 is disposed about shutter release engagement arm 4i and yet a further region of synthetic material 22 is disposed about right-angle bent lug 4g.

Both curved track regions 16 and 17 and regions 18 and 22 are formed of a synthetic material, such as an engineering plastic material. Suitable materials include polymers and copolymers of nylon, acetal, or the like. The inwardly facing surface of each such region is dimensioned to cooperate with the outer surface of cylindrical shutter housing 1c. Specifically, the surface of each of the regions of synthetic material is formed with an inwardly facing arcuate region for providing a lubricating surface for permitting locking-ring element 4 to be rotatable about cylindrical shutter housing 1c when the shutter mechanism is activated.

First curved track region 16 is formed with curved track 12 for receiving guide pin 15 on toggle lever 13 for operatively pivoting toggle lever 13 in camming fashion when locking-ring element 4 is displaced about cylindrical shutter housing 1c. Similarly, second curved track region 17 formed with guide track 10 receives a guide pin in camming fashion for operatively pivoting a toggle lever for a second locking shutter blade which has not been shown.

Referring specifically to FIG. 1, locking ring-shaped element 4 is shown in locking biased engagement. A first shutter spring 9 is mounted between shutter frame 1a and first arm 4e and a second shutter spring 11 is mounted between shutter frame 1a and second arm 4f. Shutter release engagement arm 4h is engaged with a latch handle 8 pivotally mounted to shutter frame 1a for holding locking-ring element 4 in the biased locked position as illustrated in FIG. 1. The shutter is released by displacing shutter release key 7 in a direction as shown by an arrow A to pivot latch handle 8 in a counter-clockwise direction about a pin 8' as shown by an arrow B. This releases the locking engagement between latch handle 8 and shutter release engagement arm 4h. After release, locking ring-shaped element 4 rotates in the counter-clockwise direction as shown by an arrow C thereby operatively displacing locking shutter blade 14 in the direction of an arrow D and the second shutter blade (not shown) for actuating the shutter. When shutter 1 is actuated and locking-ring element 4 is rotated, locking shutter blade 14 is displaced across edge 3 in opening 1b. Locking-ring 4 is then returned to the locking-biased position as shown in FIG. 1 prior to actuating the shutter release mechanism as described.

Referring now to FIG. 3, an exploded perspective view of a shutter including three locking-ring elements constructed and arranged in accordance with the invention is shown generally as 1. Shutter 1 includes substantially planar shutter frame 1a having a substantially circular opening 1b therethrough and cylindrical housing 1c disposed perpendicular to housing 1a. Cylindrical housing 1c is formed with axial slit 2 for receiving a shutter leaf (not shown in this view) and sliding edge 3 upon which the shutter leaf is displaced. In this shutter constructed and arranged in accordance with the invention a series of three locking ring-shaped elements disposed about housing 1c is provided.

Shutter 1 includes a first locking ring-shaped element 40 having an upper region of synthetic material 41 and an opposed lower region of synthetic material 42. Synthetic material regions 41 and 42 are formed with inner surfaces 41' and 42', respectively, dimensioned to cooperate with the outer curved surface of cylindrical housing 1c. In a region approximately mid-way between regions 41 and 42 are disposed a first operating region of synthetic material 43 having a track 44 and an opposed second operating region of synthetic material 45 having a track 46. The inward facing surfaces 43' and 45' of regions 43 and 45, respectively, are also formed for cooperating with the outer surface of cylindrical housing 1c so that first locking ring-shaped element 40 may operatively rotate about cylindrical housing 1c. First and second operating regions 43 and 45 are formed with track regions 44 and 46 for receiving guide pins (not shown) for operatively displacing respective levers and shutter leaves in the manner described in connection with the embodiment illustrated in FIG. 1.

A second locking ring-shaped element 50 is provided adjacent to first locking ring-shaped element 40 and includes a first pair of opposed synthetic material regions 51 and 52 and a second pair of opposed synthetic material regions 53 and 54. Each region is provided with an inwardly facing surface having a curve for cooperating with the outer surface of cylindrical housing 1c indicated by a primed numeral.

A third locking ring-shaped element 60 is disposed between second ring element 50 and shutter frame 1a and is formed from a metal sheet ring with a pair of opposed engagement arms 61 and 62 for mounting shutter springs (not shown) in the manner described in connection with FIG. 1. Third ring element 60 includes a first pair of opposed engagement regions 63 and 64 formed from synthetic material adjacent to arm 61 and 62, respectively. Each region 63 and 64 has an interior surface 63' and 64', respectively, formed for cooperating with the outer surface of cylindrical housing 1c. A second pair of opposed engagement regions 65 and 66 formed from synthetic material are also formed with the respective interior surfaces 65' and 66' dimensioned to cooperate with cylindrical housing 1c.

Figure 4:
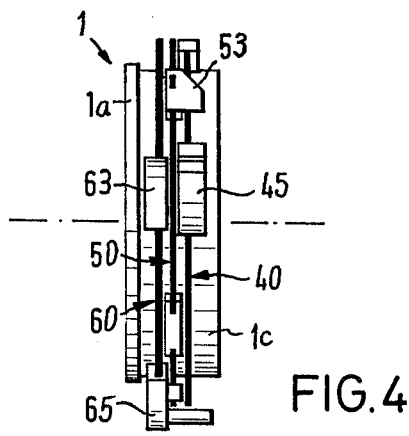
FIG. 4 is a side elevational view of the shutter dipicted in FIG. 3.

Referring now to FIG. 4, assembly of the shutter illustrated in FIG. 3 can be seen. When adjacent locking ring-shaped elements 60, 50 and 40 are assembled on housing 1c, the respective regions of synthetic material are arranged so that they are in different positions radially for providing a space-saving feature. In this respect, it can be seen that when the shutter is assembled locking ring-shaped elements 60, 50 and 40 are positioned very close to each other with the synthetic material regions of the adjoining rings lying in a free area of an adjacent ring. By constructing and arranging the rings in this manner the width of each synthetic material region is not cumulative in the direction of the thickness of the regions.

By constructing and arranging the shutter in this manner in accordance with the invention, the advantages of conventional metal rings and those of the traversing rings formed from synthetic material can be obtained without the disadvantages of either. The need to work and finish the surface of a metal ring in order to reduce the mass is avoided. In addition, fixing the synthetic material having the intricate engagement surfaces and the metallic ring element may be done in a relatively easy manner by extrusion coating. In this respect separate fixing elements, such as rivets or the like can be avoided. The use of synthetic material, such as polymers and copolymers of nylon or acetal for forming the intricate engagement surfaces also provide acceptable lubricating quality between the ring element and the bearing support surface of cylindrical housing 1c about shutter opening 1b. Moreover, this lubricating feature enhances the operative engagement between the engaging surfaces and the members for activating the shutter mechanism. In the preferred embodiments as illustrated, the sliding surfaces of the synthetic material are disposed on the inwardly facing edges of the synthetic material regions for cooperating with the outer surface of the cylindrical shutter housing.

As noted above, a significant advantage of a shutter constructed and arranged in accordance with the invention is the need to provide only regions of synthetic material and free surface therebetween so that two adjoining rings can be brought relatively close to each other. The necessary distance between the metal rings is limited only by the minimum thicknesses of the synthetic material which can be applied by extrusion coating. Therefore, a camera shutter with a locking compartment and the ring formed elements in accordance with the invention is characterized by the fact that several ring-formed elements may be arranged adjacent to each other in a way that the synthetic material regions of one element in a radial direction from the middle axis, always lies adjacent to the synthetic material region of an adjoining ring-formed element.

In addition, by providing the synthetic material regions only in segments as needed for operating and lubricating surfaces, a significant advantage is obtained as the rings tend not to dislocate. Dislocation occurs in metal rings completely coated by extrusion where there is a shrinking of the synthetic material which gives rise to stresses in the rings which tend to deform the ring. This occurs even though there is not any significant contraction in the radial direction due to the stresses imparted to the ring. On the other hand, if the synthetic material and metal ring are anchored in the region of the middle of the synthetic material segment and the adjoining edges are smooth, then any potential contraction of the synthetic material would not adversely influence the performance of the ring-formed element. It has been found to be a significant advantage of this invention that when the synthetic material regions are formed from a synthetic material having high specific weights, these regions can be provided on the ring element itself to form engaging projections and arms as noted above in connection with the description of the preferred embodiments.

It will thus be seen that the objects set forth above and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A ring-shaped element for a camera mechanism comprising a substantially ring-shaped member formed from a metal sheet dimensioned to cooperate with a fixed substantially cylindrical member of the camera for rotation of the ring about the axis of the cylindrical camera member, said ring formed with operating regions of a synthetic material which are molded to provide engagement means for operative engagement with activating means of the camera, at least two operating regions anchored on the ring member and formed with a sliding surface for cooperating with the wall of the cylindrical member when the ring is rotated in relation to the axis of the cylindrical member.

2. The element of claim 1 wherein the sliding surfaces of the operating regions are formed with a curve for cooperating with the curved wall of the cylindrical member.

3. The element of claim 1, wherein the ring-shaped member is formed with a substantially circular opening therethrough, said opening dimensioned to rotate about the cylindrical member and the sliding surfaces are formed on the inwardly facing edges of the operating regions.

4. The element of claim 3 wherein said ring-shaped member includes two pair of opposed operating regions.

5. The element of claim 4, wherein at least one said operating regions is formed with a camming surface for displacing a camera element in response to rotation of said ring-shaped member.

6. The element of claim 5, wherein one of said pairs of operating regions include one camming surface on each region for displacing camera shutter elements in response to rotation of said ring-shaped element.

7. The ring-shaped element of claim 4, further including outwardly extending arms for operatively engaging said ring-shaped member to said camera mechanism.

8. The ring-shaped element of claim 1, further including openings formed in the metal of said ring for anchoring said synthetic material to said ring.

9. In a camera shutter having a fixed substantially cylindrical body and a series of ring-shaped elements which are selectively displaced from a first biased at rest position to a second position after the shutter is operated, the improvement which comprises at least one ring-shaped member formed from a metal sheet dimensioned to cooperate with the fixed substantially cylindrical member for rotation of the ring elements about the axis of the cylindrical member, said rings formed with at least two operating regions of a synthetic material which are anchored to said metal ring.

10. The shutter of claim 9 including a plurality of said ring-shaped members arranged adjacent to each other with the operating regions of the synthetic material on one ring at a different radial position than the adjacent ring for providing a space-saving construction.

11. The shutter of claim 10, including three ring-shaped elements.

12. The shutter of claim 11 wherein each of the ring-shaped elements is dimensioned to fit a substantially cylindrical fixed member of the shutter for rotation thereabout for operation of the shutter.

13. The shutter of claim 12 wherein the ring-shaped members are formed with a substantially circular opening therethrough and the operating regions are formed with an inwardly facing sliding surfaces for cooperating with the outer wall of the cylindrical member of the shutter when the rings rotate thereabout.

14. The shutter of claim 13, wherein at least one of said operating regions is formed with a camming surface for actuating said shutter in response to rotation of said at least one ring element.

* * * * *